F. TOWNSEND.
ELECTRIC RELAY.
APPLICATION FILED MAR. 5, 1906.
911,549.
Patented Feb. 2, 1909.
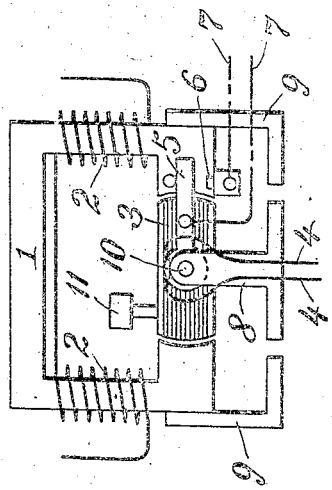
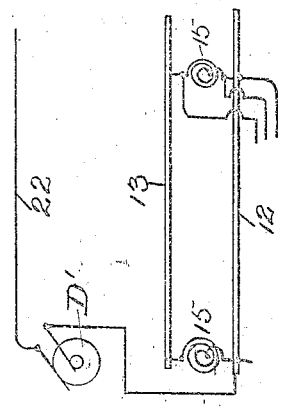
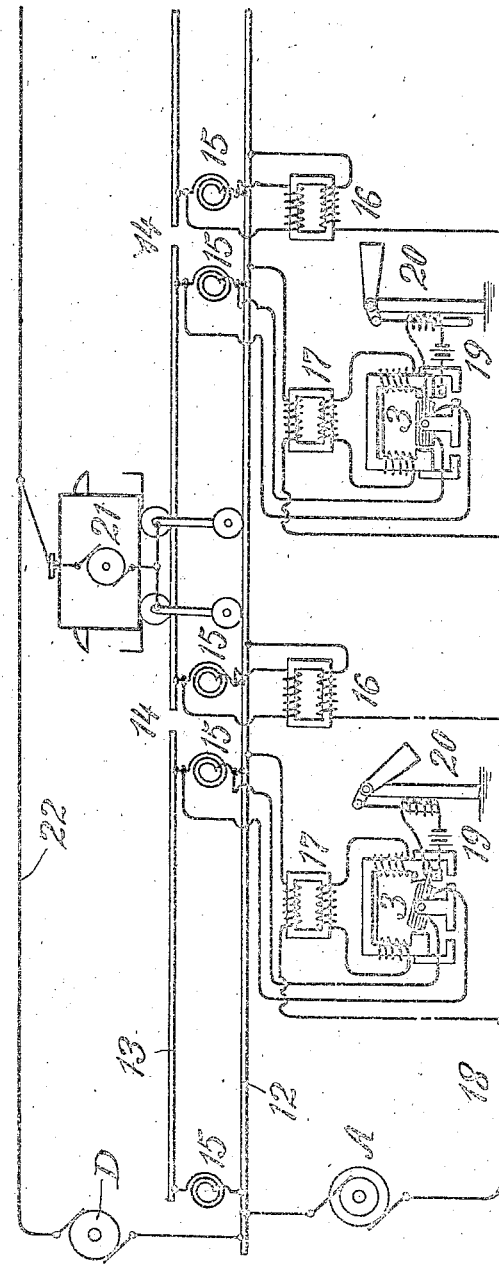
WITNESSES:
INVENTOR
Fitzhugh Townsend
BY
ATTORNEY

UNITED STATES PATENT OFFICE.

FITZHUGH TOWNSEND, OF NEW YORK, N. Y., ASSIGNOR TO SAMUEL MARSH YOUNG, OF NEW YORK, N. Y.

ELECTRIC RELAY.

No. 911,549.

Specification of Letters Patent.

Patented Feb. 2, 1909.

Original application filed June 13, 1904, Serial No. 212,293. Divided and this application filed March 5, 1906. Serial No. 304,374.

*To all whom it may concern:*

Be it known that I, FITZHUGH TOWNSEND, a citizen of the United States, residing at New York city, county and State of New York, have invented certain new and useful Improvements in Electric Relays, of which the following is a specification.

My invention consists in a relay to be operated by alternating current in connection with an automatic block signaling system for electric railways, or in other situations where a relay is required to be operated by a current of a definite frequency.

In my invention, the stationary part of the relay consists in an electro-magnet energized by a current of a definite frequency. The movable member of the relay, which carries a contact arm, consists of a coil whose plane, when in a position of equilibrium, is that of the magnetic field between the pole tips of the stationary electro-magnet. If a current is sent through this movable coil or armature, of the same frequency and phase as that which energizes the field, a turning moment will be produced, and the coil will rotate through a sufficient arc to close a contact.

One of the advantageous features of this relay is that direct current may flow through the armature coil without producing any turning moment, on account of the fact that the field is alternating. Also an alternating current of a frequency other than that of the field may flow through the armature coil without resulting in a turning moment. The relay, therefore, is a selective relay, responding only to current of a particular frequency.

Figure 1 is an end elevation of the relay, showing its construction. Fig. 2, is a diagram, showing the application of the relay to a system of block signaling, where direct current is used as the power current. Fig. 3 is a partial diagram illustrating the connections where alternating current is used as the power current.

In the diagrams, 1 is the stationary field magnet, wound with the coils 2, 2, through which an alternating current of definite frequency derived from generator A is made to pass.

3, is the movable armature, consisting of a coil of wire, whose terminals are shown at 4, 4. In the normal position, the plane of coil 3 is the same as that of the lines of force passing from one field pole to the other.

5, is a contact arm, which makes contact with the fixed point 6 when current flows through the relay armature.

7, 7, are terminals to be connected to a local circuit which is to be closed and opened between the contact arm 5 and the fixed point 6.

9, 9, are supporting pieces which carry the weight of the field frame.

8, is one of the standards supporting the armature, which is pivoted at 10.

11 is a counter-weight holding the armature in the horizontal position when deënergized.

12, 13, represent the rails of the trackway of an electric railway, deriving its power from generator D, Fig. 2, or D', Fig. 3. The rail 12 is continuous but rail 13 is divided into sections at the points 14, 14. 15, 15, are reactance bonds. The block sections so constituted are each energized at one end by transformers 16. The relay armature 3 is connected in each block across the reactance bond situated at the end of the block opposite to that where the transformer is connected. The relay field coils 2 are energized from the secondary of a transformer 17, which has its primary energized from and connected across the terminals of an alternating current generator A. The primary of the transformer 16 is energized from the same source of alternating current and consequently the current supplied by such transformer, to the track rails of a block section, will be of the same frequency as that of the current in the field coils 2 of the relay. The current derived from the secondary of the transformer 16 will maintain a difference of potential between the rails 12 and 13 of a block, so that the terminals of the armature 3 of the relays will have impressed upon them an alternating E. M. F., provided the rails of the block are not short-circuited by the wheels of the car on the block. The alternating current sent through the armature 3 being of the same frequency as the alternating field of the relay, will produce a deflection, moving the contact arm 5 into contact with the contact point 6, thus closing a local circuit energized by a battery 19, which operates the signal 20. A car, as shown at 21, on any one block, reduces the alternating difference of potential between the rails to zero, thus deenergizing the armature 3 of the relay which will return to its neutral position, interrupting the current of the battery 19 and allowing the signal 20 to go to "danger."

In the case of an alternating current road, the frequency of the relay field should preferably be different from that of the power current which operates the cars. In this case, even though the power current were to produce a difference of potential between the rails 12 and 13, this difference of potential being of a different frequency from that of the signaling current, will not affect the relay armature on account of the selective feature of the relay, which causes the armature to tend to turn only when energized by current synchronous and in phase with the field of the relay.

In a direct current road, a difference of potential may also in practice occur between the rails 12 and 13, but this difference of potential being constant and not alternating, will not result in producing a deflection of the armature 3. Hence, as already explained, the armature 3 can only be caused to rotate by currents of the same frequency as that of the field.

I wish it to be understood that the system of block signaling shown in Fig. 2 is merely illustrative of the application of my invention. The relay described is applicable to all cases where it is desired to close a local circuit by means of an impulse of one particular frequency, received over a transmission line also carrying currents of other frequencies.

This application is a division of my former application, Serial No. 212,298, filed June 13, 1904, and I wish it understood that I make no claims in this application for the system of automatic block signaling described in said former application.

Having thus described my invention, I claim:

1. A selective relay comprising a fixed member having polar extensions, a movable member pivotally mounted between said polar extensions, and having a coil thereon whose plane when in a position of equilibrium will be that of the magnetic field between the polar extensions.

2. A selective relay comprising a fixed member having field coils thereon, a movable member consisting of a coil of wire so disposed that the plane of such coil, when in a position of equilibrium, will be that of the magnetic field between the polar extensions of the fixed member, whereby when separately controlled alternating currents of the same phase and frequency are sent through said coils a turning movement of the movable member will take place.

3. A selective relay comprising a fixed member having horizontally disposed and opposed polar extensions and an exciting coil thereon, a movable member pivotally mounted between said polar extensions and having a coil thereon, whose plane when in a position of equilibrium will be that of the magnetic field between the polar extensions, an arm mounted on said movable member, a counterweight mounted on said movable member, whereby when separately controlled alternating currents corresponding in phase and frequency are sent through said fixed and movable members, a turning movement of the movable member will result, and said movable member restored to its normal position when the current transmitted through the movable member ceases.

4. A selective relay comprising a stationary field energized by a current of definite phase and frequency, a movable armature coil, whose plane when in a position of equilibrium will be that of the magnetic field, energized by a separately controlled current of the same phase and frequency, means carried by said armature for closing a local circuit, and means carried by said armature for restoring said armature to its normal position after the current exciting the turning movement in said armature has ceased.

5. A selective relay comprising a stationary field energized by a current of definite phase and frequency, a movable armature coil, whose plane when in a position of equilibrium will be that of the magnetic field, traversed by a separately controlled current of the same phase and frequency and by a current differing in character from that traversing said field or armature, and means carried by said armature for closing a local circuit when a turning movement is imparted to said armature under the influence of the alternating current traversing its coil.

6. In an electric relay device the combination of a stationary field energized by a current of a definite frequency, a movable armature coil, whose plane when in a position of equilibrium will be that of the magnetic field, traversed by currents differing from each other in frequency and phase, one of these currents being of the same frequency and phase as that of the current in the field coils and therefore producing a turning movement in the armature coil, an auxiliary circuit controlled by the motion of the armature coil, and a contact arm carried by this armature coil so as to open or close the auxiliary circuit.

7. In an electric relay device the combination of a stationary field energized by a current of a definite frequency, a movable armature coil, whose plane when in a position of equilibrium will be that of the magnetic field, traversed by direct current and by an alternating current of the same frequency and phase as that of the current in the field coils, and therefore producing a turning movement in the armature coil, an auxiliary circuit controlled by the motion of the armature coil, and a contact arm carried by this armature coil so as to open or close the auxiliary circuit.

8. In an electric relay device the combination of a stationary field energized by a current of a definite frequency, a movable armature coil traversed by currents differing from each other in frequency and phase, one of these currents being of the same frequency and phase as that of the current in the field coils and, therefore, producing a turning moment in the armature coil, an auxiliary circuit controlled by the motion of the armature coil, and a contact arm carried by this armature coil so as to open or close the auxiliary circuit.

9. In an electric relay device the combination of a stationary field energized by a current of a definite frequency, a movable armature coil traversed by direct current and by an alternating current of the same frequency and phase as that of the current in the field coils, and, therefore, producing a turning moment in the armature coil, an auxiliary circuit controlled by the motion of the armature coil, and a contact arm carried by this armature coil so as to open or close the auxiliary circuit.

In testimony whereof, I affix my signature, in the presence of two witnesses.

FITZHUGH TOWNSEND.

Witnesses:
 FRANK O'CONNOR,
 W. H. PUMPHREY.